US012418767B2

(12) United States Patent
Tracey et al.

(10) Patent No.: US 12,418,767 B2
(45) Date of Patent: Sep. 16, 2025

(54) SURROUND SOUND LOCATION VIRTUALIZATION

(71) Applicant: Bose Corporation, Framingham, MA (US)

(72) Inventors: James Tracey, Norfolk, MA (US); Guy Torio, Holliston, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 18/109,512

(22) Filed: Feb. 14, 2023

(65) Prior Publication Data

US 2023/0276188 A1 Aug. 31, 2023

Related U.S. Application Data

(63) Continuation of application No. 16/777,404, filed on Jan. 30, 2020, now Pat. No. 11,582,572.

(51) Int. Cl.

| | |
|---|---|
| ***H04R 5/02*** | (2006.01) |
| ***H04R 5/033*** | (2006.01) |
| ***H04R 5/04*** | (2006.01) |
| ***H04S 3/00*** | (2006.01) |
| ***H04S 3/02*** | (2006.01) |
| ***H04S 7/00*** | (2006.01) |

(52) U.S. Cl.

CPC ............... *H04S 7/304* (2013.01); *H04R 5/02* (2013.01); *H04R 5/033* (2013.01); *H04R 5/04* (2013.01); *H04S 3/008* (2013.01); *H04S 2400/01* (2013.01); *H04S 2400/05* (2013.01); *H04S 2400/11* (2013.01)

(58) Field of Classification Search

CPC ... G10L 19/008; G10L 19/20; H04S 2400/03; H04S 2420/01; H04S 2400/01; H04S 7/30; H04S 3/004; H04S 7/304; H04S 7/306; H04S 5/005; H04S 3500/03

USPC .................................... 381/22, 23, 300, 307

See application file for complete search history.

(56) References Cited

U.S. PATENT DOCUMENTS

2009/0304214 A1* 12/2009 Xiang ........................ H04S 7/30 381/307
2011/0026718 A1* 2/2011 Trautmann .............. H04S 1/005 381/1
2011/0200197 A1* 8/2011 Kim ........................ G10L 19/20 704/E21.001
2012/0008806 A1* 1/2012 Hess ...................... H04R 1/345 381/302
2013/0083933 A1* 4/2013 Aase .................... H04R 1/1041 381/74
2014/0376754 A1* 12/2014 Banerjea ................. H04S 3/004 381/311

(Continued)

*Primary Examiner* — George C Monikang
(74) *Attorney, Agent, or Firm* — Hoffman Warnick LLC

(57) ABSTRACT

A computer program product having a non-transitory computer-readable medium including computer program logic encoded thereon that, when performed on a surround sound audio system that is configured to render left front, right front, and center front audio signals, and also render left and right near-field binaurally-encoded audio signals, causes the surround sound audio system to develop the left and right near-field binaurally-encoded audio signals, and provide the left near-field binaurally-encoded audio signal to a left non-occluding near-field driver and provide the right near-field binaurally-encoded audio signal to a right non-occluding near-field driver.

9 Claims, 4 Drawing Sheets

(56) References Cited

U.S. PATENT DOCUMENTS

| | | | | |
|---|---|---|---|---|
| 2016/0034249 | A1* | 2/2016 | Lee | G06F 3/023 704/275 |
| 2019/0116445 | A1* | 4/2019 | Gerrard | H04S 7/303 |

* cited by examiner

SURROUND SOUND LOCATION VIRTUALIZATION

CROSS-REFERENCE TO RELATED APPLICATIONS

This application claims priority to and benefit of U.S. patent application Ser. No. 16/777,404 filed Jan. 30, 2020, the contents of which are herein incorporated by reference in their entirety.

BACKGROUND

This disclosure relates to virtually localizing sound in a surround sound audio system.

Surround sound audio systems can virtualize sound sources in three dimensions using audio drivers located around and above the listener. These audio systems are expensive, and may need to be custom designed for the listening area.

SUMMARY

All examples and features mentioned below can be combined in any technically possible way.

In one aspect a computer program product having a non-transitory computer-readable medium including computer program logic encoded thereon that, when performed on a surround sound audio system that is configured to render left front, right front, and center front audio signals, and also render left and right near-field binaurally-encoded audio signals, causes the surround sound audio system to develop the left and right near-field binaurally-encoded audio signals and provide the left near-field binaurally-encoded audio signal to a left non-occluding near-field driver and provide the right near-field binaurally-encoded audio signal to a right non-occluding near-field driver. In an example the left and right near-field binaurally-encoded audio signals are developed from a combination of front left height, front right height, back left height, and back right height audio tracks.

Some examples include one of the above and/or below features, or any combination thereof. In some examples the surround sound audio system further comprises a soundbar comprising at least two distinct drivers. In an example the computer program product further causes the surround sound audio system to provide the left and right near-field binaurally-encoded audio signals to at least one of the at least two distinct drivers of the soundbar. In an example the computer program product further causes the surround sound audio system to accomplish cross-talk cancellation on the left and right near-field binaurally-encoded audio signals before the signals are provided to at least one of the at least two distinct drivers of the soundbar. In an example front left audio tracks, front right audio tracks, center audio tracks, left surround audio tracks, and right surround audio tracks are provided to at least one of the at least two distinct drivers of the soundbar.

Some examples include one of the above and/or below features, or any combination thereof. In some examples the left non-occluding near-field driver is part of a first open-audio device that is configured to be worn such that the left non-occluding near-field driver is proximate but not in the left ear canal of a wearer of the first open-audio device, and the right non-occluding near-field driver is part of a second open-audio device that is configured to be worn such that the right non-occluding near-field driver is proximate but not in the right ear canal of a wearer of the second open-audio device. In an example the first and second open-audio devices each comprise a housing, an acoustic radiator in the housing, a sound-emitting opening in the housing, and a support structure that is configured to carry the housing on a user's head such that the housing is held proximate an ear of the user with the sound-emitting opening anterior of and proximate the tragus of the ear. In an example the first open-audio device comprises a left temple piece of audio eyeglasses and the second open-audio device comprises a right temple piece of the audio eyeglasses.

Some examples include one of the above and/or below features, or any combination thereof. In some examples the computer program product further causes the left near-field binaurally-encoded audio signal to be wirelessly provided to the left non-occluding near-field driver and the right near-field binaurally-encoded audio signal to be wirelessly provided to the right non-occluding near-field driver. In some examples the left and right non-occluding near-field drivers are located within one meter of an optimal listening area of the surround sound audio system. In some examples the left non-occluding near-field driver is located such that a ratio of sound pressure from the left non-occluding near-field driver to sound pressure from other sound sources, including the right non-occluding near-field driver, at a left ear of a listener is at least 15 dB, and the right non-occluding near-field driver is located such that a ratio of sound pressure from the right non-occluding near-field driver to sound pressure from other sound sources, including the left non-occluding near-field driver, at a right ear of a listener is at least 15 dB.

In another aspect a surround sound audio system includes multiple drivers configured to reproduce front left, front right, and front center audio signals, left and right non-occluding near-field drivers, and a processor that develops left and right near-field binaurally-encoded audio signals and is configured to provide the left near-field binaurally-encoded audio signal to the left non-occluding near-field driver and provide the right near-field binaurally-encoded audio signal to the right non-occluding near-field driver. In an example the left and right near-field binaurally-encoded audio signals are developed from a combination of front left height, front right height, back left height, and back right height audio tracks.

Some examples include one of the above and/or below features, or any combination thereof. In some examples the multiple drivers are part of a soundbar. In an example the processor is further configured to provide the left and right binaurally-encoded audio signals to at least one of the multiple drivers of the soundbar. In an example the processor is further configured to accomplish cross-talk cancellation on the left and right binaurally-encoded near-field audio signals before the signals are provided to at least one of the multiple drivers of the soundbar. In an example front left audio tracks, front right audio tracks, center audio tracks, left surround audio tracks, and right surround audio tracks are provided to at least one of the multiple drivers of the soundbar.

Some examples include one of the above and/or below features, or any combination thereof. In some examples the left non-occluding near-field driver is part of a first open-audio device that is configured to be worn such that the left non-occluding near-field driver is proximate but not in the left ear canal of a wearer of the first open-audio device, and the right non-occluding near-field driver is part of a second open-audio device that is configured to be worn such that the right non-occluding near-field driver is proximate but not in the right ear canal of a wearer of the second open-audio device. In an example the first and second open-audio devices each comprise a housing, an acoustic radiator in the housing, a sound-emitting opening in the housing, and a support structure that is configured to carry the housing on a user's head such that the housing is held proximate an ear of the user with the sound-emitting opening anterior of and proximate the tragus of the ear. In an example the first open-audio device comprises a left temple piece of audio eyeglasses and the second open-audio device comprises a right temple piece of the audio eyeglasses.

Some examples include one of the above and/or below features, or any combination thereof. In some examples the processor is further configured to cause the left near-field binaurally-encoded audio signal to be wirelessly provided to the left non-occluding near-field driver and the right near-field binaurally-encoded audio signal to be wirelessly provided to the right non-occluding near-field driver. In some examples the left and right non-occluding near-field drivers are located within one meter of an optimal listening area of the surround sound audio system. In some examples the left non-occluding near-field driver is located such that a ratio of sound pressure from the left non-occluding near-field driver to sound pressure from other sound sources, including the right non-occluding near-field driver, at a left ear of a listener is at least 15 dB, and the right non-occluding near-field driver is located such that a ratio of sound pressure from the right non-occluding near-field driver to sound pressure from other sound sources, including the left non-occluding near-field driver, at a right ear of a listener is at least 15 dB.

DETAILED DESCRIPTION

Figure 1:
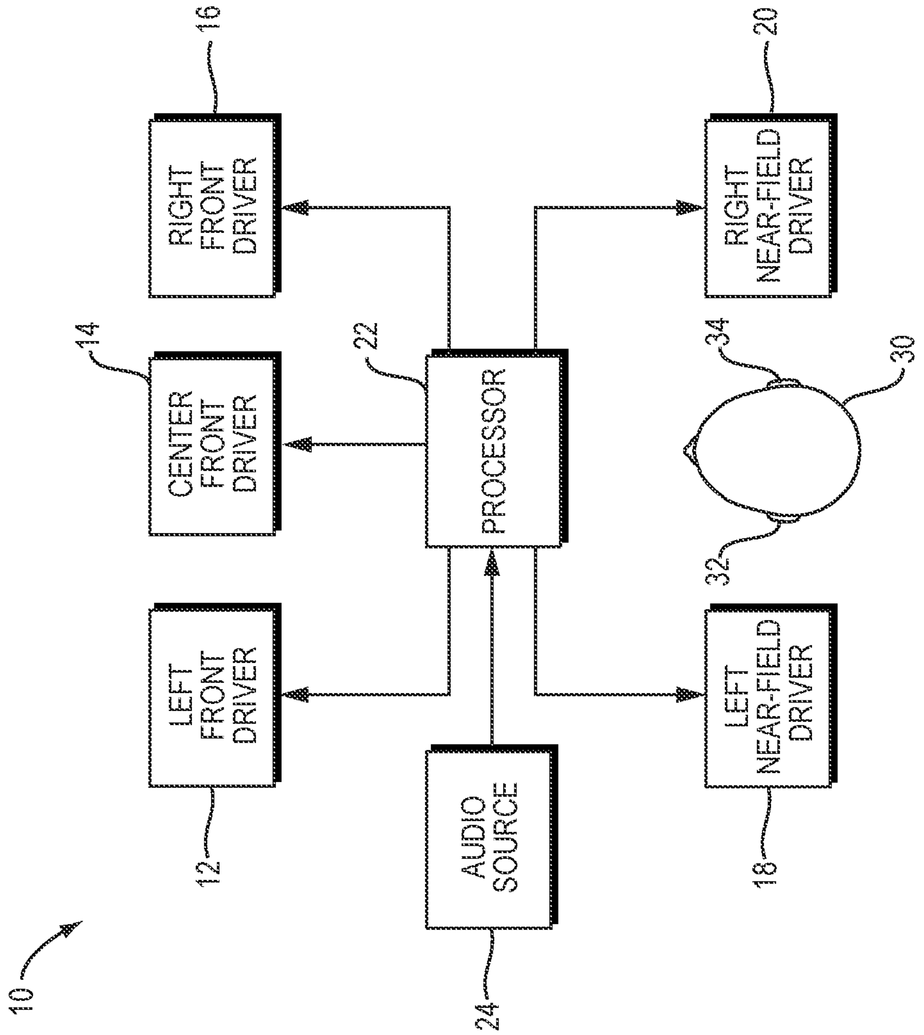
FIG. 1 is schematic diagram of a surround sound audio system that is configured to accomplish virtual sound localization.

Virtual localization of multi-channel audio content is typically accomplished using a trans-aural approach that includes cross-talk cancellation coupled with binaural encoding. Binaural encoding of audio signals, which uses head-related transfer functions, is well known in the field and so is not further described herein. In a reverberant environment, such a trans-aural approach may not be effective to virtualize sound locations due to reflections from walls and objects that result in spatial distortion.

Object-based audio sources can be used in the present audio system to render multi-channel audio content in three dimensions. Sources at different locations in 3-D space (i.e., at different locations in the horizontal plane and at different heights) can be virtualized using two or more distinct audio transducers or drivers, together with left and right near-field non-occluding audio drivers. When more than two distinct drivers are used, a beamforming approach could be used to create distinct virtual axes. Beamforming is a known audio signal processing technique and so is not further described herein. In one example some or all of the two or more distinct drivers are part of a traditional soundbar. In some examples the soundbar has left, center, and right audio drivers. In other examples the soundbar has left and right audio drivers.

Near-field non-occluding drivers generally are configured to provide sound directly to the ear with little reflected sound reaching the ear, while also minimizing cross-talk. Non-limiting examples of near-field drivers include non-occluding headsets and open-audio devices that are configured to be worn on the ear, head, neck, shoulders, or upper torso, but wherein the ear canal is not occluded. Near-field drivers can also include loudspeakers located close to the expected locations of the left and right ears of a user located at an optimal listening area, such as in the headrest of a seat or other furniture. An optimal listening area is a concept well-known in the audio field, and may include, for example, a couch or chair in a home, a seat in a motor vehicle, or a seat in a movie theater.

Object-based surround sound technologies (e.g., Dolby Atmos and DTS:X) include a large number of tracks plus associated spatial audio description metadata (e.g., location data). Each audio track can be assigned to an audio channel or to an audio object. Surround sound systems for object-based audio may have more channels than a typical residential 5.1 system. For example, object-based systems may have ten channels, including multiple overhead speakers, in order to accomplish 3-D location virtualization. During playback, the surround-sound system renders the audio objects in real-time such that each sound is coming from its designated spot with respect to the loudspeakers.

The present audio system can be configured to develop left and right binaurally-encoded audio signals from the input audio signals and metadata. The audio system is configured to virtualize any 3-D location that is specified by accompanying spatial metadata, in part by developing left and right binaurally-encoded audio signals from the input channel data. In an example, for height location virtualization the binaurally-encoded audio signals are developed from the front left height, front right height, back left height, and back right height surround sound audio tracks.

The binaurally-encoded audio signals are in some examples provided to both the two or more distinct drivers and the left and right non-occluding near-field drivers. In some examples, processing that reduces cross-talk is applied to the binaurally-encoded audio signals before the audio signals are provided to the two or more distinct drivers. Cross-talk reduction can be effective to reduce spatial distortion that might be introduced from the two or more distinct drivers, which are typically not located in the near-field. In some examples the processing that modifies cross-talk accomplishes traditional cross-talk cancellation.

Surround sound audio system 10, FIG. 1, is configured to be used to accomplish virtual localization of audio content provided to system 10 by audio source 24. In some examples, audio source 24 provides object-based surround sound signals that may include a large number of tracks plus associated spatial audio description metadata (e.g., location data). In some examples audio source 24 comprises Dolby Atmos audio signals or DTS:X audio signals.

Audio system 10 comprises processor 22 that receives the audio signals, processes them as described elsewhere herein, and distributes processed audio signals to some or all of the audio drivers that are used to reproduce the audio. In some examples system 10 includes left front driver 12, center driver 14, and right front driver 16 that are typically located in the far field relative to and generally in front of the listener, who is represented by head 30, left ear 32, and right ear 34. In some examples the far field is considered to be a distance of at least two wavelengths from the source, meaning that the actual distance is frequency dependent. For general listening the far field can be considered to be distances of at least one meter from the source. In one non-limiting example, when front drivers 12, 14, and/or 16 are present in audio system 10, the front drivers are part of a soundbar. Soundbars are components of surround-sound systems for residential use, and are well known in the field. Soundbars typically have two or more distinct drivers. Soundbars are typically but not necessarily located close to a video monitor or television, where at least some of the audio portion of the audio/visual presentation is played over the soundbar. In some examples soundbars are enabled to reproduce the left, right and center-channel audio of a surround-sound input. A common surround sound specification (5.1 surround sound) calls for six drivers (loudspeakers). These include a center driver in front of the listener, left and right drivers also in front of the listener and at an angle on the left and right side of the center, and left surround and right surround drivers that are located behind and to the left and right of the listener, respectively. The sixth driver is a subwoofer that plays low-frequency sounds and whose position relative to the listener is not critical to sound localization.

Height location virtualization, horizontal plane location virtualization, or 3D location virtualization is accomplished using left near-field driver 18 and right near-field driver 20. Audio system 10 can include one, or more than one, driver to accomplish each of the left and right near-field sound transduction. In other words, although left near-field driver 18 and right near-field driver 20 are referred to as such, there could be multiple drivers producing the left near-field audio signal and/or multiple drivers producing the right near-field audio signal, in some implementations. In some examples drivers 18 and 20 are non-occluding drivers, meaning that the entrance to the ear canal is not blocked. This allows each ear to receive audio from the other drivers in the environment (such as drivers 12, 14, and 16 which could be included in a soundbar) and the near-field driver located closest to the particular ear. Near-field non-occluding drivers generally are configured to provide sound directly to the closest ear with little reflected sound (from either near-field driver) reaching the opposite/other ear, while also minimizing cross-talk. Cross-talk is the leaking of a signal meant for one ear to the other ear. In the context of the left and right near-field drivers, cross-talk is the reception by the right ear of output from the left near-field driver, and/or the reception by the left ear of output from the right near-field driver. Non-limiting examples of near-field drivers include non-occluding headsets and open-audio devices that are configured to be worn on the ear, head, neck, shoulders, or upper torso, but wherein the ear canal is not occluded. Near-field drivers can also include loudspeakers located close to (e.g., within about one meter of) the expected locations of the left and right ears of a user located at an optimal listening area. An optimal listening area is a concept well-known in the audio field, and may include, for example, a couch or chair in a home, a seat in a motor vehicle, or a seat in a movie theater.

In some examples, near-field drivers are drivers that are located within about one meter of an optimal listening area of the surround sound audio system. Drivers located within about one meter of the optimal listening area will generally provide their sound directly to the closest ear, with little cross-talk and with little chance of reflections from fixtures or walls that might have a detrimental effect on the sound location virtualization accomplished using the left and right near-field drivers. When the left and right near-field drivers are built into the headrest of the seat of a motor vehicle, or into a seat at a movie theater, or into a seat designed to be used in a home, the drivers will typically be located within substantially less than one meter from the closest ear of a person occupying the seat. Thus, “near-field driver” as used herein includes, but is not limited to, at least one electro-acoustic transducer that is positioned within one meter of an intended user listening location. Moreover, when left and right near-field drivers are worn by a person, such as in non-occluding headphones, earbuds, eyeglasses, headbands, neckband, or other wearable audio form factors, the drivers are typically within 0.1 meters of the user’s ears. Thus, “near-field driver” as used herein also includes, but is not limited to, at least one electro-acoustic transducer that is intended to be positioned within 0.1 meters of a user’s ear. In some implementations, having the near-field drivers closer to the user’s ears improves one or more aspects of the system variously described herein. For instance, having the near-field drivers closer to the user’s ears could help improve 3-D audio virtualization capabilities and/or preventing audio spillage to others nearby, in some examples. In the case of a truly wireless audio device, where the left and right speakers are not connected via wires but are instead connected wirelessly (e.g., truly wireless in-ear earbuds or TWIE earbuds), the left and right non-occluding near-field audio signals could be sent directly to each component of the truly wireless audio device, or the left and right audio signals could be sent to one component of the truly wireless audio device (e.g., the master in a pair of components) and relayed to the other (e.g., the slave in the pair of components).

A distance-based description of near-field drivers may not in some situations sufficiently account for undesired cross-talk or reflections, at least in part because the particular audio system may not be specifically designed for the particular listening space. For example, most residential surround-sound systems are offered to consumers without specific knowledge of the location in which the system will be used, or the system layout that will be employed by the user. Accordingly, in some examples a near-field driver is described as a driver that accomplishes at least a minimum ratio of sound pressure from the driver closest to a particular ear, to sound pressure from all other audio sources, including but not limited to the other near-field driver (i.e., the driver closest to the other ear) and reverberations, at the particular ear. In some examples this minimum ratio is at least 15 dB. In situations where the near-field drivers are not worn on the body of the listener, the location of the listener relative to the near-field speakers may have an effect on this ratio. For example, if the left ear is closer to the left near-field driver than the right ear is to the right near-field driver, this ratio may differ between the two ears. Accordingly, the ratio may be described as being at an optimal listening area of the surround sound audio system. The optimal listening area may be described as a location where the two ears are equidistant from the two drivers, and at approximately a particular height relative to the drivers.

Processor 22 includes a non-transitory computer-readable medium that has computer program logic encoded thereon that is configured to develop, from audio signals provided by audio source 24, left and right binaurally-encoded audio signals. Processor 22 is also configured to provide the left binaurally-encoded audio signal to the left non-occluding near-field driver 18, and provide the right binaurally-encoded audio signal to the right non-occluding near-field driver 20. In some examples for height location virtualization the binaurally-encoded audio signals are developed from the front left height, front right height, back left height, and back right height surround sound audio tracks. The actual audio tracks from which the binaurally-encoded audio signals are developed is arbitrary and an artifact of the consumer grade object-based codec design. In other words, there could be any number of physical height speakers in the audio system. The audio objects location is independent of the number of physical speakers. Accordingly, the present techniques can be employed with an object-based audio codec bitstream in order to binaurally encode the actual spatial locations rather than rendering to a set speaker layout.

Note that the techniques described herein could be included in a computer program product that is executed by processor 22. Also note that processor 22 is shown in FIG. 1 and primarily described herein as a single processor, but in some implementations, multiple processors are utilized to perform the techniques described herein. Thus, it is can be understood based on this disclosure that processor 22 includes one or more processors. In cases where processor 22 includes multiple processors, those processors need not be included in the same device or housing. For instance, in an example implementation, some of the processing for the techniques described herein could be performed by a processor included in a soundbar while the remainder of the processing could be performed by a processor included in a mobile device. In any such cases, system 10 can perform all the processing for the techniques described herein.

Figure 2:
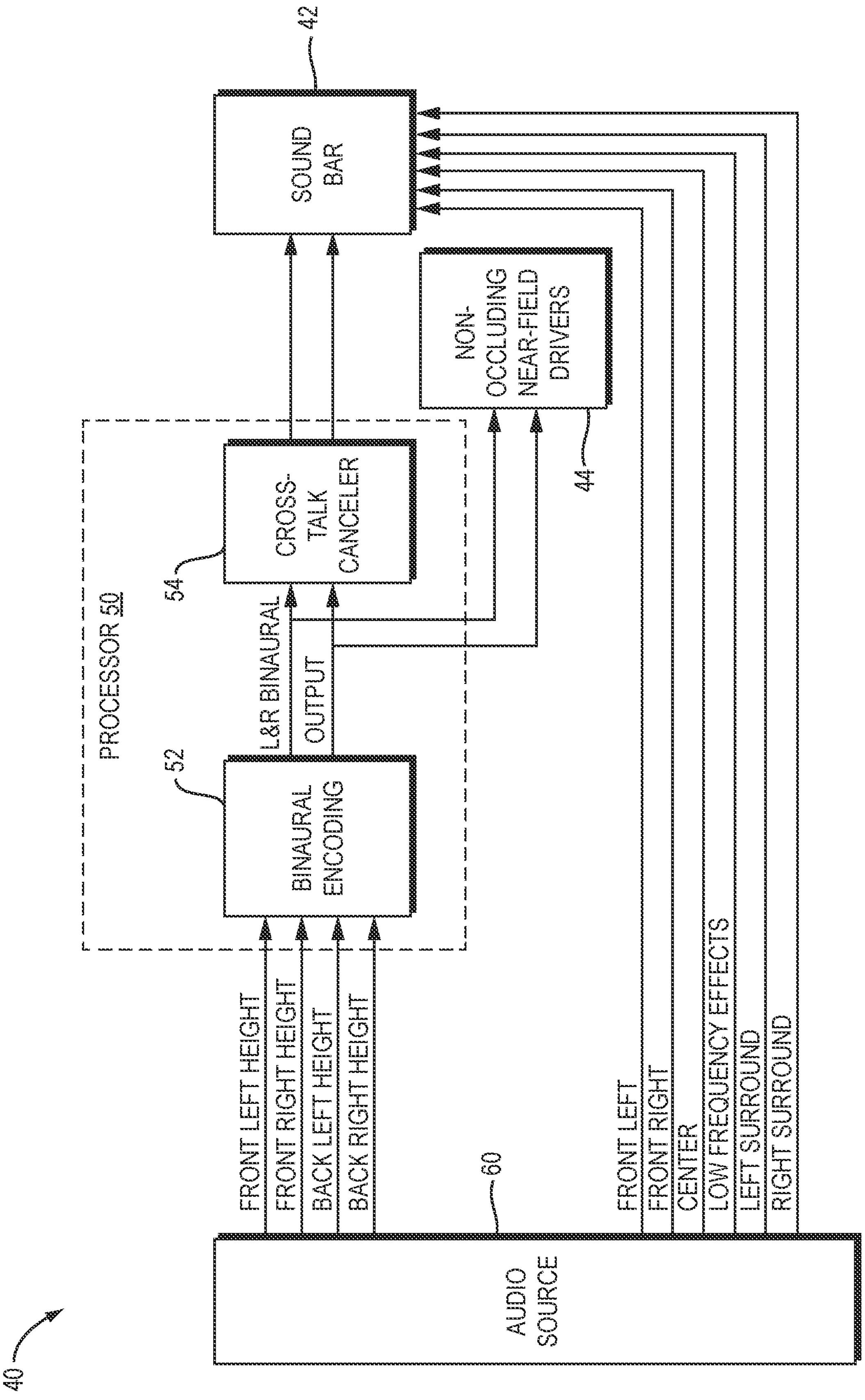
FIG. 2 is schematic diagram of a surround sound audio system that is configured to accomplish virtual sound localization.

Surround sound audio system 40, FIG. 2, is a non-limiting example of an audio system that uses a soundbar 42 and left and right non-occluding near-field drivers 44 to deliver sound which can include virtual sound sources wherein the height of such virtual sources can be controlled. In some examples the near-field drivers 44 are configured to be worn on the head or upper torso, including but not limited to non-occluding headsets and open-audio devices that are configured to be worn on the ear, head, neck, shoulders, or upper torso, but wherein the ear canal is not occluded. Examples of open audio devices include devices that are worn on each ear, for example as disclosed in U.S. Patent Application Publication 2019/0261077, the entire disclosure of which is incorporated herein for all purposes. These open audio devices include a support structure that is located behind the ear and carries a housing that encloses an acoustic radiator, where the housing is located anteriorly of and close to the tragus of the ear. The housing includes a sound outlet opening near the tragus or near but not in the ear canal. Another example of an open-audio device includes eyeglasses with audio drivers built into both the left and right temple pieces, for example as disclosed in U.S. Patent Application Publication 2019/0238971, the entire disclosure of which is incorporated herein for all purposes.

Non-occluding near-field drivers 44 allow a user to hear sound produced therefrom while also hearing sound produced from other sources within the user's environment (e.g., from soundbar 42) with minimal or no blocking effect on the sound from those other sources. In contrast, occluding audio devices, such as over-the-ear or on-the-ear headphones, or in-ear earbuds (e.g., that insert into a user's ear canal), block sound from a user's environment based on at least passive noise reduction, and sometimes also based on active noise reduction. For example, occluding audio devices typically have a noticeable affect when listening to environmental sound frequencies above the bass spectrum, such as above about 250 hertz (Hz). Thus, techniques that utilize occluding audio devices with, e.g., a subwoofer typically yield suitable results, as the occluding audio device typically does not noticeably alter the user's perception of the bass frequencies produced by the subwoofer, or at least does not alter the perception in an undesirable manner. However, the techniques described herein, that utilize non-occluding audio devices, allow a user to experience environmental sound at full or near-full spectrum. Therefore, the techniques described herein that combine out-loud audio sources with non-occluding audio sources are different from, and provide benefits over, systems that combine out-loud audio sources with occluding audio sources.

In some examples surround sound audio source 60 provides linear audio content mixed and packaged using object-based codecs. Examples of such audio sources include Dolby Atmos and DTS:X. The tracks provided by audio source 60 include the standard surround sound 5.1 tracks (front left, front right, center, left surround, right surround, and low frequency effects). Audio source 60 also provides tracks that are configured to be provided to overhead speakers in order to render the audio content in three dimensions. These tracks include front left height, front right height, back left height, and back right height tracks.

Soundbar 42 is used to accomplish traditional cross-talk cancellation-based trans-aural virtualization. This is accomplished by providing to soundbar 42 the traditional 5.1 surround sound channels described above, together with binaurally-encoded left and right height-based signals to which traditional cross-talk cancellation is applied. Note that at least two transducers are necessary to accomplish cross-talk cancellation. Binaural encoding function 52 is in this example accomplished on the front left height, front right height, back left height, and back right height tracks using processor 50. The resultant left and right binaurally-encoded signals are processed through cross-talk canceler function 54 of processor 50. Binaural encoding and cross-talk canceling are both known in the field and so are not further described herein. The left and right binaurally-encoded height-based signals from binaural encoding function 52 are also provided by processor 50 to the left and right non-occluding near-field drivers 44.

In some examples, processor 50 (or processor 22, FIG. 1) is a processor of a soundbar, and the binaural encoding and cross-talk cancelling functions are accomplished with software running on the processor. In some examples wherein some or all of the drivers are wireless, the processed audio signals are wirelessly transmitted from the soundbar to the particular driver(s). For example, when open audio devices are used to deliver the left and right near-field sound, as described above the devices may be carried on the head or torso of the listener. In such cases the processed audio signals can be transmitted to the drivers using any now-known or future-developed wireless signal transmission technology, including but not limited to Bluetooth and WiFi.

In some implementations, the system is configured to provide rear speaker audio signals from a 5.1 or 7.1 surround sound system to the non-occluding near-field drivers 44, such that a height component of the sound need not be provided. For instance, in a 5.1 surround sound system (which is the common name for six-channel surround sound audio systems), three front speakers (front left, front center, and front right) are paired with two rear speakers (rear left and rear right) and a subwoofer (or bass module) to render the six separate channels. In some instances, the front left, front center, and front right speaker audio signals of a 5.1 surround sound system are rendered by a single soundbar that still provides some spatial separation from the horizontal width of the soundbar. In some such instances, the bass component that would otherwise be provided by a subwoofer is instead provided by the soundbar. Regardless of how the front speaker and bass audio signals are rendered, the techniques and systems described herein can be used in such 5.1 surround sound systems (or other X.Y surround sound systems where X is greater than 5 and Y is at least 0). In such an implementation, the non-occluding near-field drivers 44 can be used to render at least the left and right rear speaker audio signals. For instance, using the system of FIG. 1, the left near-field driver 18 could be used to render a left rear audio signal from a 5.1 surround sound configuration and the right near-field driver 20 could be used to render a right rear audio signal from the 5.1 surround sound configuration.

In addition, in some implementations, sound from one or more other audio signals of a surround sound system could be mixed with the audio signals provided to the non-occluding near-field drivers. For example, sound from the front center audio signal of a surround sound configuration (e.g., 5.1 or 7.1) could be mixed in part or in whole with rear audio signals to create left and right non-occluding near-field audio signals, which could be done, e.g., to help increase speech intelligibility. As another example, sound from side audio signals of a 7.1 surround sound configuration could be mixed in part or in whole with rear audio signals to create left and right non-occluding near-field audio signals, which could result in not needing side speakers in the 7.1 configuration (as well as not needing conventional rear speakers). Regardless, in any such cases where non-occluding near-field drivers are used in a surround sound system, their use differs from conventional surround sound systems, as such conventional systems are configured to space the rear speakers in the far-field, such as in the corners of a theater or living room.

In another example the left and right near-field audio signals could be transmitted via Bluetooth LE Audio. The audio signals could be transmitted via the multi-stream topology, where the left signal would be sent to the left driver(s) and the right signal would simultaneously be sent to the right driver(s). In another example the audio signals could be sent via the Bluetooth LE broadcast topology, where both the left and right audio signals are broadcast by the audio system (e.g., from the soundbar), for multiple devices to connect to. In such a scheme, the near-field devices (e.g., Bose® Frames or truly wireless earbuds) would receive the broadcast stream and manage how to render the left and right near-field audio signals. This could more-easily enable movie theaters to utilize such a system; speakers and Bluetooth receivers could be installed in all of the headrests without needing to run audio wires. Then the Bluetooth receivers could be set to receive the left and right near-field audio signals for that specific screen.

The combination of cross-talk cancelation-based transaural virtualization provided by soundbar 42 (with center, left, and right drivers) and the near-field non-occluding binaural virtualization provided by non-occluding near-field drivers 44 allows audio system 40 to virtualize sound locations in three-dimensional space relative to a listening position without the need for front left height, front right height, back left height, and back right height drivers.

Figure 3:
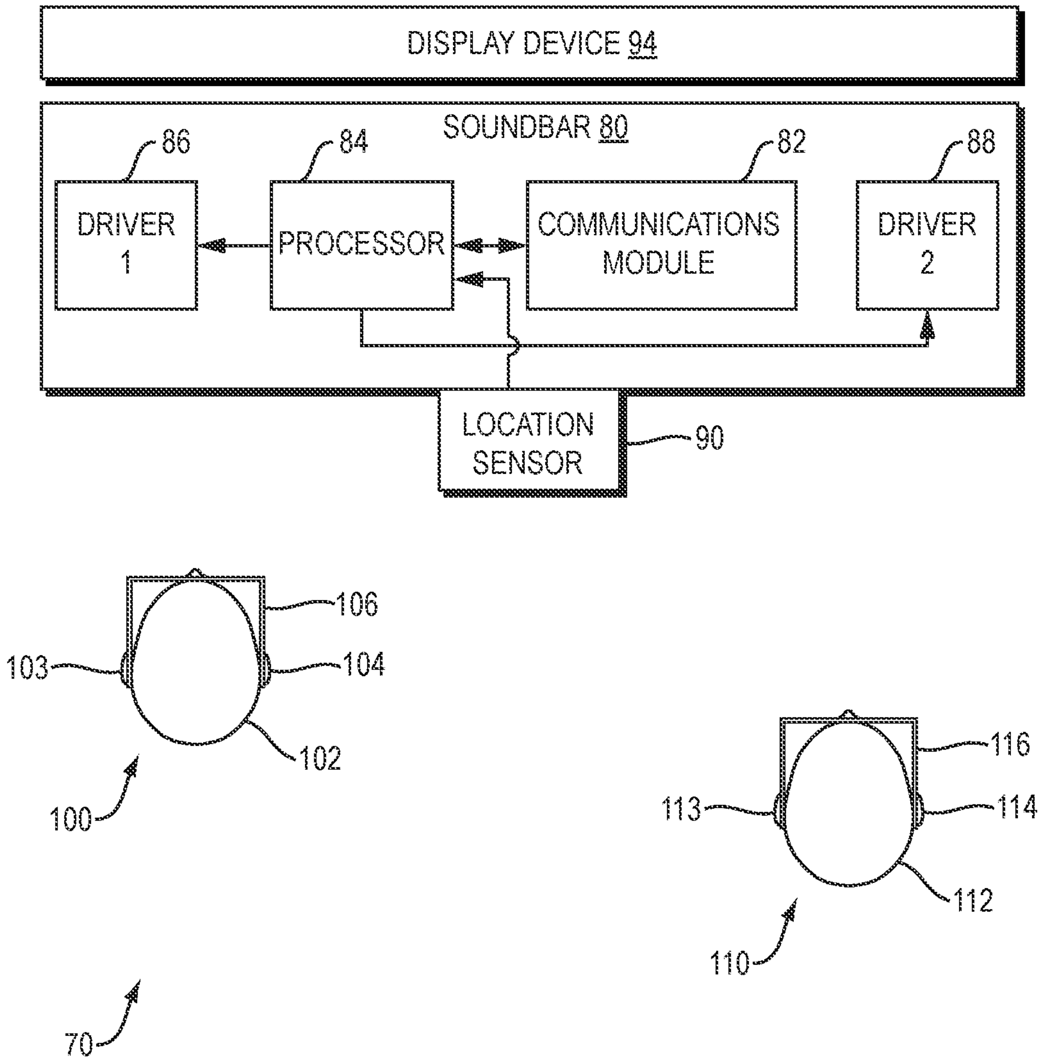
FIG. 3 is schematic diagram of a surround sound audio system that is configured to accomplish virtual sound localization.

FIG. 3 illustrates surround sound audio system 70 that is configured to accomplish sound location virtualization. In this example soundbar 80 is located proximate display device 94 (which in an example is a television). Soundbar 80 can be configured to play sound from television 94. Soundbar 80 comprises distinct drivers 1 and 2 (elements 86 and 88, respectively). Audio signals are received (wirelessly or via wires) from audio source(s) by communications module 82. Processor 84 is configured to process the received audio signals; audio signal processing is described elsewhere herein. Processed audio signals are provided to drivers 1 and 2. In an example drivers 1 and 2 output the front left, front right, and center channels of surround sound.

Communications module 82 is also configured to wirelessly transmit left and right near-field binaurally-encoded audio signals to persons wearing open audio devices. In an example these left and right near-field binaurally-encoded audio signals reflect the position of the person wearing the device. In this example there are two people (schematically represented by heads 102 and 112), each wearing an open audio device 106 and 116, respectively. In an example open audio devices 106 and 116 are audio eyeglasses such as Bose® Frames audio sunglasses, available from Bose Corporation, Framingham, MA USA, which are also disclosed in the U.S. Patent Application Publication 2019/0238971 that is incorporated by reference herein. Open audio device 106 has left and right temple pieces that sit over left ear 103 and right ear 104, respectively. Open audio device 116 has left and right temple pieces that sit over left ear 113 and right ear 114, respectively.

System 70 is able to manage multiple open-audio devices by simultaneously sending the left and right binaurally-encoded near-field audio signals to all paired open audio devices being used. Processor 84 is configured to adjust the left and right binaurally-encoded near-field audio signals that are transmitted to each open audio device. In an example this adjustment is based on the location of the device in space relative to the remainder of soundbar 80 and/or the related display device 94. The location of the open audio device can be determined in any feasible manner, using any now-known of future-developed technology. In an example the location is determined using sensors (e.g., cameras, head-tracking sensors, or microphones) connected to the open audio device, the audio system (e.g., the soundbar), and/or the display device. In the illustrated exemplary system 70, soundbar 80 includes location sensor 90 that inputs open-audio device location-related information to processor 84 so that such information can be taken into account in the development by the processor of the left and right near-field binaurally-encoded audio signals that are transmitted to each of open audio devices 106 and 116.

Figure 4:
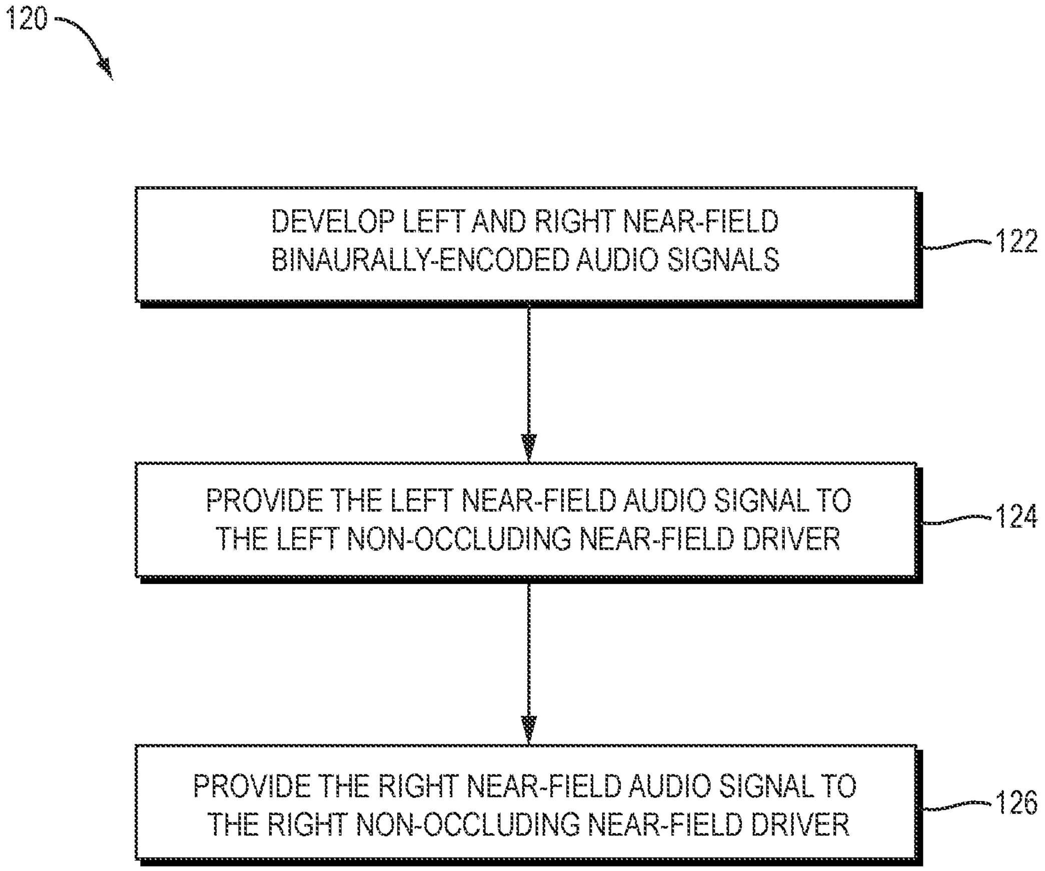
FIG. 4 is a flow chart illustrating an operation of a surround sound audio system that is configured to accomplish virtual sound localization.

FIG. 4 comprises flow-chart 120 that illustrates an operation of a computer program product having a non-transitory computer-readable medium including computer program logic encoded thereon that is performed on a surround sound audio system (such as those detailed in FIGS. 1-3) that is configured to render left front, right front, and center front audio signals, and also render left and right near-field binaurally-encoded audio signals. At step 122 the computer program product causes the surround sound audio system to develop the left and right near-field binaurally-encoded audio signals. At step 124 the computer program product causes the surround sound audio system to provide the left near-field binaurally-encoded audio signal to the left non-occluding near-field driver. At step 126 the computer program product causes the surround sound audio system to provide the right near-field binaurally-encoded audio signal to the right non-occluding near-field driver.

Elements of FIGS. 1-3 are shown and described as discrete elements in a block diagram. These may be implemented as one or more of analog circuitry or digital circuitry. Alternatively, or additionally, they may be implemented with one or more processors (e.g., microprocessors) executing software instructions. The software instructions can include digital signal processing instructions. Operations may be performed by analog circuitry or by a processor executing software that performs the equivalent of the analog operation. Signal lines may be implemented as discrete analog or digital signal lines, as a discrete digital signal line with appropriate signal processing that is able to process separate signals, and/or as elements of a wireless communication system (e.g., using WiFi or Bluetooth).

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawings.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods set forth herein is described as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. An audio device comprising:

at least one speaker; and at least one processor configured to process an input audio signal received from an audio source to develop an out-loud audio signal, process the input audio signal to develop left and right near-field binaurally-encoded audio signals, render the out-loud audio signal using the at least one speaker, and cause the left and right near-field binaurally encoded audio signals to be transmitted to one or more other audio devices, wherein the one or more other audio devices are configured to render the left and right near-field binaurally-encoded audio signals in combination with the rendering of the out-loud audio signal, and wherein the one or more other audio devices each include non-occluding near-field drivers, wherein during rendering of the left and right near-field binaurally-encoded audio signals at the non-occluding near-field drivers, a user of the non-occluding near-field drivers experiences environmental sound at full spectrum or near-full spectrum, and wherein each non-occluding near-field driver provides a minimum ratio of sound pressure to a closest ear of the user, to sound pressure from all other audio sources, of at least 15 decibels (dB).

2. The audio device of claim 1, wherein the left and right near-field binaurally encoded audio signals are developed from front left height, front right height, back left height, and back right height surround sound audio tracks.

3. The audio device of claim 1, wherein the left and right near-field binaurally encoded audio signals are used to render a left rear audio signal and a right rear audio signal, respectively, from a 5.1 surround sound configuration.

4. The audio device of claim 1, wherein the at least one speaker includes a soundbar.

5. The audio device of claim 4, wherein the at least one processor is located at the soundbar, and wherein the soundbar includes at least two distinct drivers.

6. The audio device of claim 1, wherein the input audio signal is at least one of object-based audio or channel-based audio.

7. The audio device of claim 1, wherein rendering the left and right near-field binaurally-encoded audio signals helps to increase speech intelligibility.

8. The audio device of claim 4, further comprising a location sensor at the soundbar that inputs location-related information to the at least one processor, wherein rendering the left and right near-field binaurally-encoded audio signals is based at least in part on the location-related information.

9. The audio device of claim 1, wherein the non-occluding near-field drivers are in the headrest of a seat or other furniture.

* * * * *